(12) United States Patent
Ha

(10) Patent No.: US 11,754,837 B2
(45) Date of Patent: Sep. 12, 2023

(54) OPTICAL DEVICE FOR AUGMENTED REALITY HAVING EXTERNAL LIGHT LEAKAGE PREVENTION FUNCTION

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 79 days.

(21) Appl. No.: 17/606,409

(22) PCT Filed: Apr. 20, 2020

(86) PCT No.: PCT/KR2020/005211
§ 371 (c)(1),
(2) Date: Oct. 25, 2021

(87) PCT Pub. No.: WO2020/218790
PCT Pub. Date: Oct. 29, 2020

(65) Prior Publication Data
US 2022/0197031 A1 Jun. 23, 2022

(30) Foreign Application Priority Data
Apr. 26, 2019 (KR) .................. 10-2019-0049149

(51) Int. Cl.
*G02B 27/01* (2006.01)
*F21V 8/00* (2006.01)
*G06T 19/00* (2011.01)

(52) U.S. Cl.
CPC ......... *G02B 27/017* (2013.01); *G02B 6/0031* (2013.01); *G06T 19/006* (2013.01); *G02B 2027/0178* (2013.01)

(58) Field of Classification Search
CPC ............... G02B 27/017; G02B 6/0031; G02B 2027/0178; G02B 6/00; G02B 5/003; G02B 27/0172; G02B 30/00; G06T 19/006
See application file for complete search history.

(56) References Cited

U.S. PATENT DOCUMENTS

2020/0183169 A1* 6/2020 Peng .................... G02B 6/0055

FOREIGN PATENT DOCUMENTS

| JP | 2000098924 A | 4/2000 |
|----|--------------|--------|
| JP | 2016110108 A | 6/2016 |
| JP | 2016528533 A | 9/2016 |
| JP | 2018041096 A | 3/2018 |

(Continued)

*Primary Examiner* — Jeffery A Brier
(74) *Attorney, Agent, or Firm* — Rabin & Berdo, P.C.

(57) ABSTRACT

The present invention provides an optical device for augmented reality having an external light leakage prevention function, the optical device including: an image output unit configured to output image light corresponding to an image for augmented reality; at least one reflective unit configured to transfer the image light to the pupil of an eye of a user by reflecting the image light; and an optical means configured such that the reflective unit is disposed therein and it transmits at least part of image light, output from a real object, therethrough toward the pupil; wherein the at least one reflective unit is formed to have a size of 4 mm or less, and includes a first surface configured to reflect the former image light toward the pupil and a second surface which is a surface opposite to the first surface; and wherein the second surface is made of a light absorbing material.

8 Claims, 6 Drawing Sheets

(56) References Cited

FOREIGN PATENT DOCUMENTS

| KR | 101660519 B1 | 9/2016 | |
|----|---|---|---|
| KR | 1020180028339 A | 3/2018 | |
| KR | 1020180121523 A | 11/2018 | |
| WO | WO-2018091984 A1 * | 5/2018 | ......... G02B 27/0075 |
| WO | WO-2021119021 A2 * | 6/2021 | ......... G02B 27/0172 |

* cited by examiner

WHEN VIEWED
FROM THE OUTSIDE

WHEN VIEWED
FROM THE PUPIL

OPTICAL DEVICE FOR AUGMENTED REALITY HAVING EXTERNAL LIGHT LEAKAGE PREVENTION FUNCTION

TECHNICAL FIELD

The present invention relates to an optical device for augmented reality, and more particularly to an optical device for augmented reality having an external light leakage prevention function that can prevent stray light from leaking to the outside.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and a resulting image to be provided. As such an optical system, there is known a technology using an optical means, such as a prism, that reflects or refracts a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and a technology for electrically controlling a variable focal lens in response to a change in focal length. However, these technologies also have a problem in that a user needs to perform additional operations in order to adjust focal length or hardware such as a separate processor and software for controlling focal length are required.

In order to overcome the problems of the conventional technologies, the present applicant has developed an optical device capable of implementing augmented reality by projecting a virtual image onto the retina through the pupil using a reflective unit having a smaller size than a human pupil, as described in patent document 1 below.

FIG. 1 is a diagram showing an optical device for augmented reality such as that disclosed in patent document 1.

Referring to FIG. 1, an image output unit 30 is a means for outputting image light corresponding to an image for augmented reality, and may be implemented as, e.g., a small-sized display device. A reflective unit 20 provides the image for augmented reality to a user by reflecting image light corresponding to an image for augmented reality, output from the image output unit 30, to the pupil of the user.

An optical means 10 is a means for transmitting at least part of the image light output from a real object, therethrough, and may be, e.g., a lens of eyeglasses. The reflective unit 20 is embedded inside the optical means 10. A frame unit 40 is a means for fixing and supporting both the image output unit 30 and the optical means 10.

The reflective unit 20 of FIG. 1 is formed to have a smaller size, i.e., 8 mm or less, than the average human pupil. By forming the reflective unit 20 to be smaller than the pupil as described above, the depth of field for light entering the pupil through the reflective unit 20 can be made almost infinite, i.e., considerably deep. Here, "depth of field" refers to a range within which an image for augmented reality is recognized as being in focus. When the depth of field increases, a focal length for an image for augmented reality get increased accordingly. Thus, even when a user changes the focal length for the real world while gazing at the real world, an image for augmented reality is always recognized as being in focus regardless of such a change. This may be considered as a kind of pinhole effect. Accordingly, the optical device for augmented reality can always provide a clear virtual image for an image for augmented reality even when a user changes the focal length while gazing at a real object in the real world.

This technology has the advantages of increasing the depth of field and obtaining a pinhole effect, however, there may occur a light leakage phenomenon in which part of image light corresponding to an image for augmented reality leaks when the optical device for augmented reality is viewed from the outside, so that this exerts negative influence on confidentiality and design.

This light leakage phenomenon occurs in the same manner not only in the technology of FIG. 1 but also in other optical devices for augmented reality using a diffractive optical element (DOE) or a half mirror.

FIGS. 2 and 3 illustrate a phenomenon in which light is leaked to the outside, which occurs in a conventional optical device for augmented reality.

These light leakage phenomenon give rise to problems in that light is leaked not only in the direction of the pupil of a user but also in an external direction, so that light is visible to persons outside, thereby making it difficult to maintain confidentiality and causing poor visibility in terms of design when the optical device is worn. Furthermore, there is a problem in that optical efficiency is lowered to the extent that light is leaked to the outside.

[Patent Document 1]

Korean Patent No. 10-1660519 (published on Sep. 29, 2016)

DISCLOSURE

Technical Problem

The present invention has been conceived to overcome the above-described limitations, and an object of the present invention is to provide an optical device for augmented reality that can prevent a light leakage phenomenon in which light leaks to the outside.

Another object of the present invention is to provide an optical device for augmented reality that can prevent light from leaking to the outside, so that the optical device can maintain confidentiality, is excellent in terms of appearance, and can increase optical efficiency.

Technical Solution

In order to accomplish the above objects, the present invention provides an optical device for augmented reality having an external light leakage prevention function, the optical device including: an image output unit configured to output image light corresponding to an image for augmented reality; at least one reflective unit configured to transfer the image light corresponding to an image for augmented reality, output from the image output unit, to the pupil of an eye of a user by reflecting the image light toward the pupil, thereby providing the image for augmented reality to the user; and an optical means configured such that the reflective unit is disposed therein and configured to transmit at least part of image light, output from a real object, therethrough toward the pupil of the eye of the user; wherein the at least one reflective unit is formed to have a size of 4 mm or less, and includes a first surface configured to reflect the image light corresponding to an image for augmented reality, output from the image output unit, toward the pupil of the eye of the user and a second surface which is a surface opposite to the first surface; and wherein the second surface is made of a light absorbing material that does not reflect light.

In this case, the second surface is preferably coated with a light absorption material.

Furthermore, the first surface of the at least one reflective unit may be made of a reflective material that reflects light.

Furthermore, the at least one reflective unit preferably has a transparency of 5% or less.

Furthermore, the at least one reflective unit preferably has a thickness of 500 μm or less.

Furthermore, at least a part of the edge surfaces of the optical means except for the surface on which the image light is incident from the image output unit is preferably made of a light absorption material.

According to another aspect of the present invention, there is provided an optical device for augmented reality having an external light leakage prevention function, the optical device including: an image output unit configured to output image light corresponding to an image for augmented reality; an auxiliary optical unit configured to transfer the image light corresponding to an image for augmented reality, output from the image output unit, to at least one reflective unit; the at least one reflective unit configured to transfer the image light corresponding to an image for augmented reality, transferred from the auxiliary optical unit, to the pupil of an eye of a user by reflecting the image light toward the pupil, thereby providing the image for augmented reality to the user; and an optical means configured such that the auxiliary optical unit and the reflective unit are disposed therein and configured to transmit at least part of image light, output from a real object, therethrough toward the pupil of the eye of the user; wherein the at least one reflective unit is formed to have a size of 4 mm or less; wherein the auxiliary optical unit includes a first surface configured to reflect the image light corresponding to an image for augmented reality, output from the image output unit, toward the reflective unit, and a second surface which is a surface opposite to this first surface; wherein the at least one reflective unit includes a first surface configured to reflect the image light corresponding to an image for augmented reality, reflected from the auxiliary optical unit, toward the pupil of the eye of the user, and a second surface which is a surface opposite to this first surface; and wherein the second surfaces of the auxiliary optical unit and the at least one reflective unit are made of a light absorbing material that does not reflect light.

In this case, at least a part of the edge surfaces of the optical means except for the surface on which the image light is incident from the image output unit is preferably made of a light absorbing material.

Advantageous Effects

According to the present invention, there can be provided the optical device for augmented reality that can prevent a light leakage phenomenon in which light leaks to the outside.

Furthermore, according to the present invention, there can be provided the optical device for augmented reality that can prevent light from leaking to the outside, so that the optical device can maintain confidentiality, is excellent in terms of appearance, and can increase optical efficiency.

BEST MODE

Embodiments of the present invention will be described in detail below with reference to the accompanying drawings.

Figure 1:
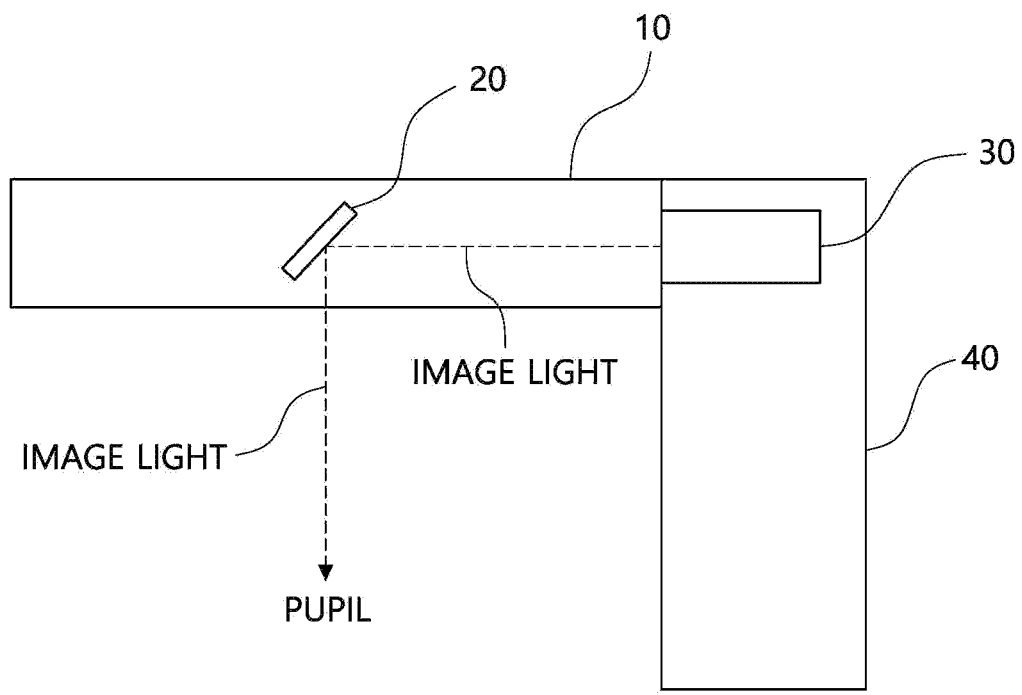
FIG. 1 is a diagram showing an optical device for augmented reality such as that disclosed in patent document 1.
Figure 2:
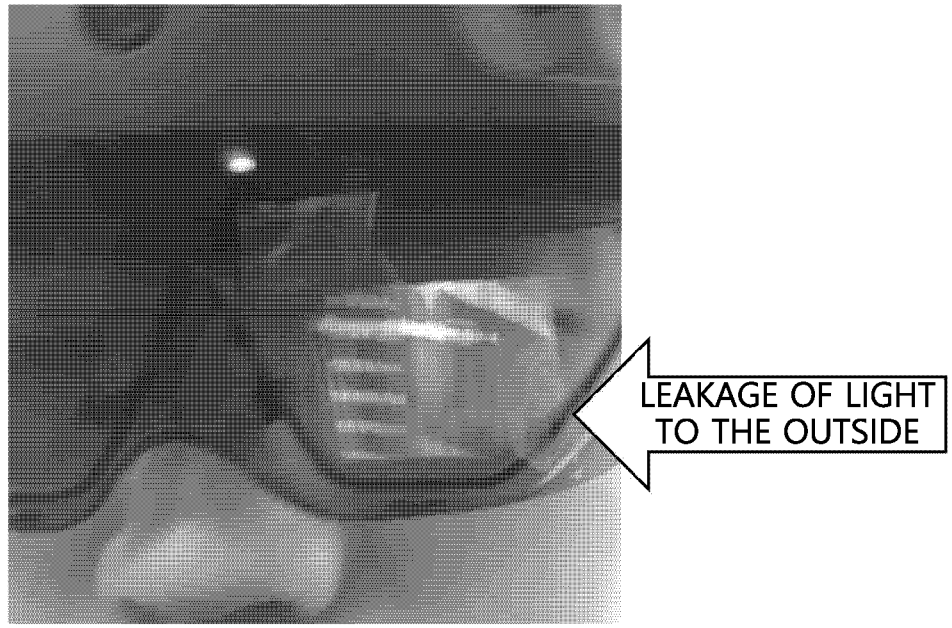
FIGS. 2 and 3 illustrate a phenomenon in which light is leaked to the outside, which occurs in a conventional optical device for augmented reality.
Figure 3:
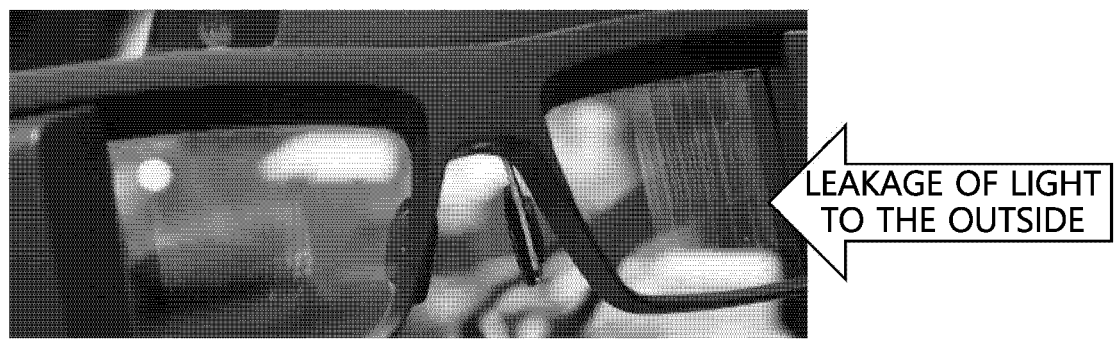
Figure 4:
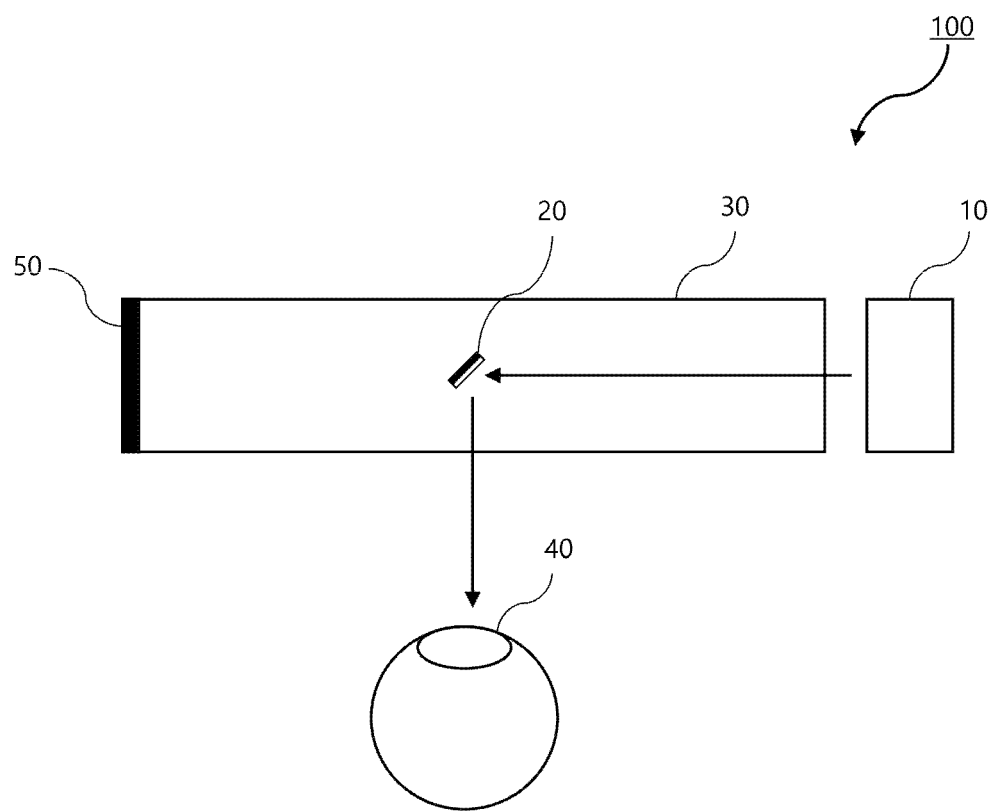
FIG. 4 is a diagram showing the configuration of an optical device (100) for augmented reality having an external light leakage prevention function according to the present invention.

FIG. 4 is a diagram showing the configuration of an optical device 100 for augmented reality having an external light leakage prevention function according to the present invention.

Referring to FIG. 4, the optical device 100 for augmented reality having an external light leakage prevention function (hereinafter simply referred to as the "optical device 100") includes an image output unit 10, a reflective unit 20, and an optical means 30.

The image output unit 10 is a means that outputs image light corresponding to an image for augmented reality. For example, the image output unit 10 may be a display device such as a small-sized LCD, or a reflective or refractive means that outputs image light output from a display device by reflecting or refracting the image light.

In other words, the image output unit 10 refers to a display device itself that displays an image for augmented reality, or refers to other various means such as a reflective or refractive means that outputs image light output from a display device.

Since the image output unit 10 itself is not a direct target of the present invention and is known in the prior art, a detailed description thereof will be omitted.

Meanwhile, the image for augmented reality refers to a virtual image that is displayed on a display device and transferred to the pupil 40 of a user through the reflective unit 20 when the display device is the image output unit 10, or refers to a virtual image that is displayed on a display device and transferred to the pupil 40 of a user through the image output unit 10 and the reflective unit 20 when the display device is not the image output unit 10.

The image for augmented reality may be a still image or moving image.

The image for augmented reality is output from the image output unit 10 and transferred to the pupil 40 of the user through the reflective unit 20, so that a virtual image is provided to the user. At the same time, image light output from a real object present in the real world is transferred to the user through the optical means 30. As a result, the virtual image is provided while being superimposed on the real object, so that the user is provided with an augmented reality service.

The image output unit 10 is disposed in a direction perpendicular to the pupil 40 with respect to the reflective unit 20 and shown as being disposed on a side when the user gazes at the front, however, this is exemplary. When the user gazes at the front, it may be disposed on an upper side, a lower side, or the like, or may be disposed at a different angle.

The reflective unit 20 is a means that transfers image light corresponding to an image for augmented reality, output from the image output unit 10, to the pupil 40 of an eye of the user by reflecting the image light toward the pupil 40, thereby providing the image for augmented reality to the user.

The reflective unit 20 may be embedded and disposed inside the optical means 30, or may be disposed on the surface (the surface facing the pupil 40 of the user) of the optical means 30.

The reflective unit 20 is disposed at an appropriate angle between the image output unit 10 and the pupil 40 in order to reflect image light corresponding to an image for augmented reality toward the pupil 40.

The reflective unit 20 is formed to have a size smaller than the size of the average human pupil, i.e., 8 mm or less, more preferably 4 mm or less, in order to obtain a pinhole effect by increasing the depth of field, as described in the background art section above.

In other words, the reflective unit 20 is formed to have a size smaller than the size of the common human pupil, so that the depth of field for light entering the pupil 40 through the reflective unit 20 can be made almost infinite, i.e., considerably deep. Accordingly, there can be obtained a pinhole effect that allows an image for augmented reality to be always recognized as being in focus regardless of a change in focal length even when the user changes the focal length for the real world while gazing at the real world.

Figure 5:
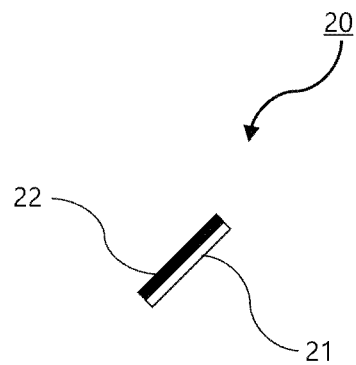
FIG. 5 shows a side view of a reflective unit (20)

Meanwhile, as shown in FIG. 5, the reflective unit 20 includes a first surface 21 configured to reflect image light corresponding to an image for augmented reality, output from the image output unit 10, toward the pupil 40 of the eye of the user, and a second surface 22 which is a surface opposite to the first surface 21. The second surface 22 is characterized in that it is made of a light absorbing material that does not reflect light.

FIG. 5 shows a side view of the reflective unit 20.

As shown in FIG. 5, the reflective unit 20 includes a first surface 21 and a second surface 22 opposite to the first surface 21. The second surface 22 is made of a light absorbing material.

Here, the light absorbing material refers to a material having the property of not reflecting light. What the second surface 22 is made of a light-absorbing material means that the second surface 22 is coated with paint made of a material having the property of absorbing light without reflecting light or that the second surface 22 itself is made of a light absorption material. Since such a light absorbing material and such paint made of a light absorbing material are known in the prior art and are not direct targets of the present invention, detailed descriptions thereof will be omitted.

When the second surface 22 is coated with a light absorption material, the second surface 22 does not need to be completely opaque. It is sufficient if the transparency of the reflective unit 20 is, e.g., 5% or less. In this case, the transparency refers to the ratio of the intensity of light incident on the first surface 21 of the reflective unit 20 to the intensity of light output through the second surface 22 after light has been incident on the first surface 21. In other words, this means that the percentage at which the second surface 22 made of a light absorption material blocks light without reflecting light is 95%.

Meanwhile, the first surface 21 is preferably made of a reflective material having the property of reflecting light because it needs to reflect image light corresponding to an image for augmented reality, output from the image output unit 10, toward the pupil 40. This may also be achieved by a method of making the first surface 21 itself of a reflective material such as a metallic material having the property of reflecting light or by a method of coating the first surface 21 with paint made of a reflective material.

According to this configuration, the second surface 22 does not reflect unintentional stray light incident on the second surface 22, so that there is the advantage of minimizing light leaked to the outside through the optical means 30 when the optical device 100 is viewed from the outside.

Meanwhile, as the thickness of the reflective unit 20 increases, the percentage at which image light output from the outside, i.e., a real object, is blocked becomes higher, so that it is preferable to form the reflective unit 20 to be as thin as possible. In practice, it is preferable that the total thickness of the reflective unit 20 be, e.g., 500 μm or less.

Referring back to FIG. 4, the optical means 30 is a means in which the reflection unit 20 is disposed and which transmits at least part of image light, output from a real object, toward the pupil 40 of an eye of the user.

The optical means 30 may be implemented using a material such as glass or transparent plastic. The optical means 30 is placed in front of the pupil 40 of the user during use, and transmits image light, output from a real object present in the real world, therethrough to the pupil 40.

The optical means 30 may be implemented using a translucent material, in which case the optical means 30 transmits the image light, output from a real object, therethrough to the pupil 40 in part.

The optical means 30 may be coupled to the surface of the lenses of a glasses-type augmented reality provision apparatus (not shown), including lenses and a frame, in a module form. Alternatively, the lenses themselves of the augmented reality provision apparatus may be implemented as the optical means 30.

The image light corresponding to an image for augmented reality output from the image output unit 10 may be directly transferred to the reflective unit 20, or it may be transferred after being reflected at least once from the inner surface of the optical means 30.

Furthermore, at least a part of the edge surfaces of the optical means 30 except for the surface on which the image light is incident from the image output unit 10 may be made of a light absorbing material.

Referring to FIG. 4, it can be seen that a surface 50 opposite to the surface on which the image light is incident from the image output unit 10, among the edge surfaces of the optical means 30, is made of a light absorption material. According to this configuration, stray light or ghost image light that would be reflected by the opposite surface 50 may be prevented from being reflected, so that light leaked to the outside through the optical means 30 may be further minimized.

Although only the opposite surface 50 is shown as being made of a light absorbing material in FIG. 4, top and bottom surfaces, which are the remaining edges, may also be made of a light absorbing material.

Meanwhile, although the only one reflective unit 20 is shown in the above-described embodiment, it is obvious that the reflective unit 20 may be implemented as a plurality of reflective units.

Figure 6:
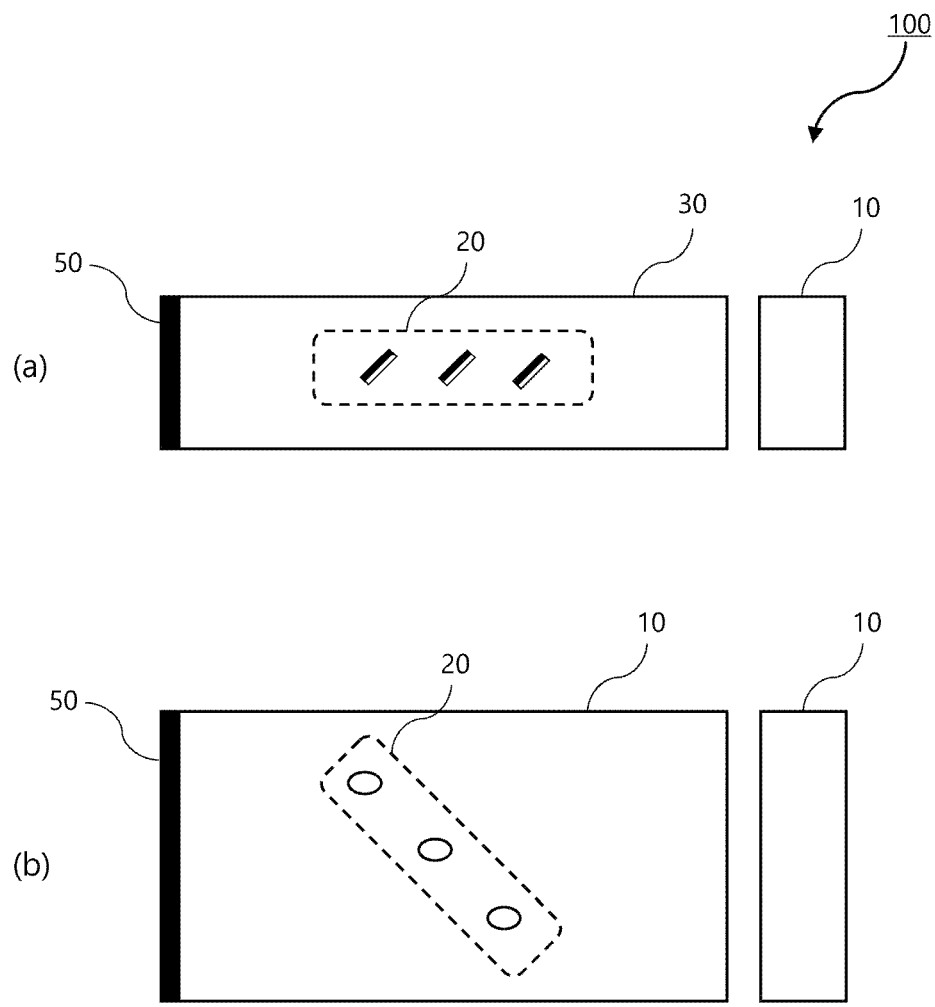
FIG. 6 shows an optical device (100) according to another embodiment of the present invention.

FIG. 6 shows an optical device 100 according to another embodiment of the present invention.

The embodiment of FIG. 6 is basically the same as the embodiment described in conjunction with FIGS. 4 to 5, but is characterized in that a plurality of reflective units 20 is formed.

FIG. 6(a) is a top view seen from above when the optical device 100 is placed in the forward direction from the pupil 40 of the user, and FIG. 6(b) is a front view when the optical device 100 is viewed from the forward direction from the pupil 40.

As shown in FIG. 6, when the reflective units 20 are viewed from the top in the forward direction from the pupil 40, three reflective units are disposed inclined at approximately 45 degrees when viewed from the forward direction from the pupil 40, as shown in FIG. 4(b). According to this disposition structure, each of the reflective units 20 may transfer image light, output from an image output unit 10, to the pupil 40 by reflecting the image light toward the pupil 40.

Even in the case of FIG. 6, the second surface 22 of each of the reflective units 20 is also made of a light absorbing material as described above, and thus stray light is prevented from being leaked to the outside by the second surface 22.

Also in FIG. 6, a surface 50 opposite to the surface on which the image light is incident from the image output unit 10, among the edge surfaces of an optical means 30, may be made of a light absorption material.

Figure 7:
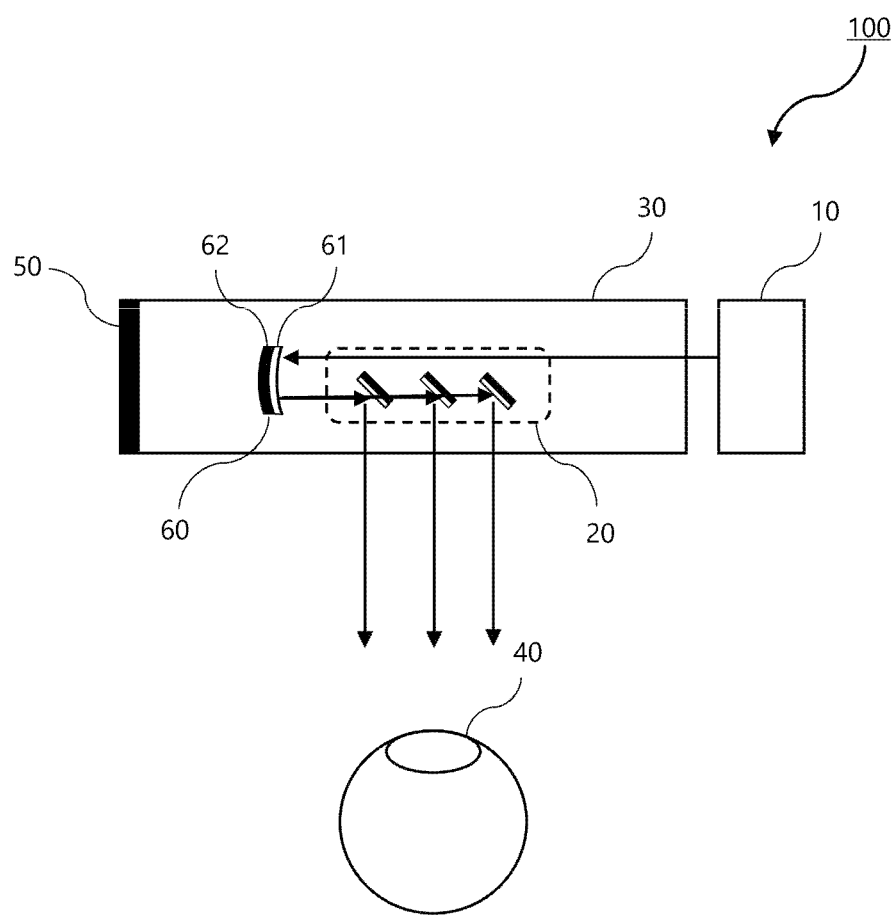
FIG. 7 is a diagram illustrating an optical device (100) according to still another embodiment of the present invention.

FIG. 7 is a diagram illustrating an optical device 100 according to still another embodiment of the present invention.

The embodiment of FIG. 7 is basically the same as the embodiment of FIG. 6, but they are different in that an auxiliary optical unit 60 is further included.

The auxiliary optical unit 60 is a means that is disposed inside an optical unit 30 and transfers image light corresponding to an image for augmented reality, output from an image output unit 10, to reflective units 20.

Furthermore, the auxiliary optical unit 60 includes a first surface 61 configured to reflect image light corresponding to an image for augmented reality, output from the image output unit 10, toward the reflective units, and a second surface 62 which is a surface opposite to the first surface 61. The second surface 62 is made of a light absorbing material that does not reflect light, as described above.

Meanwhile, the reflective units 20 may be implemented as one or more reflective units. Each of the reflective units 20 includes a first surface 21 configured to reflect image light corresponding to an image for augmented reality, reflected from the auxiliary optical unit 60, toward the pupil of an eye of a user, and a second surface 22 which is a surface opposite to the first surface, as described above. The second surface 22 is also made of a light absorbing material that does not reflect light, as described above.

In the embodiment of FIG. 7, the reflective units 20 do not directly receive image light from the image output unit 10, but receive image light through the auxiliary optical unit 60. Accordingly, the first surface 21 and the second side 22 are disposed in the directions opposite to those in the embodiment of FIG. 4.

According to the embodiment of FIG. 7, there is an advantage in that stray light may be reliably prevented from being leaked to the outside even when the auxiliary optical unit 60 is used.

Since the configurations described in conjunction with FIGS. 4 to 6 may be used without change for other configurations in the embodiment of FIG. 7, detailed descriptions thereof will be omitted.

Figure 8:
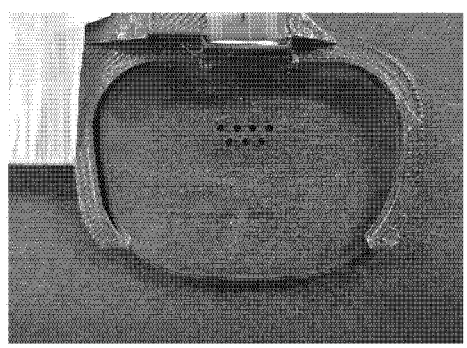
FIG. 8 shows actual photos illustrating the effect of a light leakage phenomenon by the optical device (100) according to the present invention.
Figure 8:
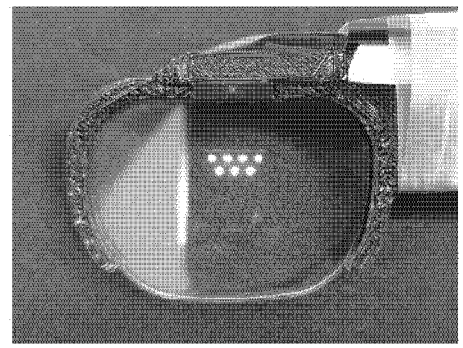

FIG. 8 shows actual photos illustrating the effect of a light leakage prevention function by the optical device 100 according to the present invention.

As shown in FIG. 8, it can be seen that, when viewed from the outside, the optical device 100 according to the present invention appears black and almost no light leaks to the outside because the second surface 22 of the reflective unit 20 is made of a light absorbing material that does not reflect light.

Figure 9:
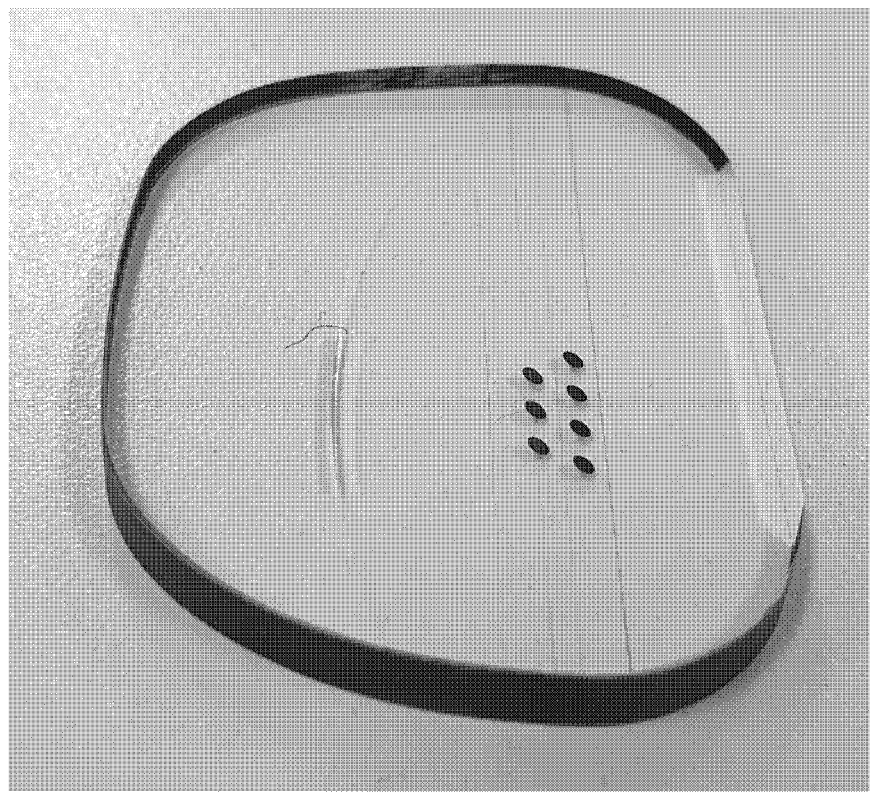
FIGS. 9 and 10 show actual photos of a reflective unit (20) and an optical means (30) according to the present invention.
Figure 10:
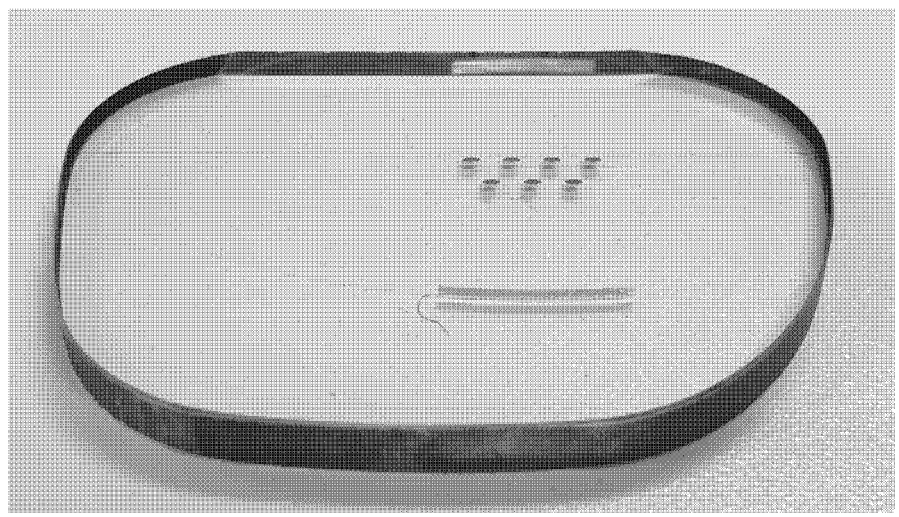

FIGS. 9 and 10 show actual photos of the reflective unit 20 and the optical means 30 according to the present invention.

As shown in FIGS. 9 and 10, it can be seen that the second surface 21 of the reflective unit 20 is coated with a light absorbing material that does not reflect light, so that the reflective unit 20 appears black and rarely reflects light to the outside, with the result that the effect of preventing light leakage to the outside is obtained.

While the present invention has been described with reference to the preferred embodiments of the present invention, it is obvious that the present invention is not limited to the embodiments and other various modifications and alterations are possible.

The invention claimed is:

1. An optical device for augmented reality having an external light leakage prevention function, the optical device comprising:
    a display device configured to output image light corresponding to an image for augmented reality;
    at least one reflective unit configured to transfer the image light corresponding to an image for augmented reality, output from the display device, to a pupil of an eye of a user by reflecting the image light toward the pupil, thereby providing the image for augmented reality to the user; and
    an optical means configured such that the reflective unit is disposed therein and configured to transmit at least part of image light, output from a real object, therethrough toward the pupil of the eye of the user;
    wherein the at least one reflective unit is formed to have a size of 4 mm or less, and includes a first surface configured to reflect the image light corresponding to an image for augmented reality, output from the display device, toward the pupil of the eye of the user and a second surface which is a surface opposite to the first surface; and
    wherein the second surface is made of a light absorbing material that does not reflect light.

2. The optical device of claim 1, wherein the second surface is coated with a light absorbing material.

3. The optical device of claim 1, wherein a first surface of the at least one reflective unit is made of a reflective material that reflects light.

4. The optical device of claim 1, wherein the at least one reflective unit has a transparency of 5% or less.

5. The optical device of claim 1, wherein the at least one reflective unit has a thickness of 500 μm or less.

6. The optical device of claim 1, wherein at least a part of edge surfaces of the optical means except for a surface on which the image light is incident from the display device is made of a light absorbing material.

7. An optical device for augmented reality having an external light leakage prevention function, the optical device comprising:
- an display device configured to output image light corresponding to an image for augmented reality;
- an auxiliary optical unit configured to transfer the image light corresponding to an image for augmented reality, output from the display device, to at least one reflective unit;
- the at least one reflective unit configured to transfer the image light corresponding to an image for augmented reality, transferred from the auxiliary optical unit, to a pupil of an eye of a user by reflecting the image light toward the pupil, thereby providing the image for augmented reality to the user; and
- an optical means configured such that the auxiliary optical unit and the reflective unit are disposed therein and configured to transmit at least part of image light, output from a real object, therethrough toward the pupil of the eye of the user;
- wherein the at least one reflective unit is formed to have a size of 4 mm or less;
- wherein the auxiliary optical unit includes a first surface configured to reflect the image light corresponding to an image for augmented reality, output from the display device, toward the reflective unit, and a second surface which is a surface opposite to the first surface;
- wherein the at least one reflective unit includes a first surface configured to reflect the image light corresponding to an image for augmented reality, reflected from the auxiliary optical unit, toward the pupil of the eye of the user, and a second surface which is a surface opposite to the first surface; and
- wherein the second surfaces of the auxiliary optical unit and the at least one reflective unit are made of a light absorbing material that does not reflect light.

8. The optical device of claim 7, wherein at least a part of edge surfaces of the optical means except for a surface on which the image light is incident from the display device is made of a light absorbing material.

* * * * *